United States Patent [19]

Liedenbaum

[11] Patent Number: 5,652,669
[45] Date of Patent: Jul. 29, 1997

[54] OPTICAL SYNCHRONIZATION ARRANGEMENT

[75] Inventor: Coen T. H. F. Liedenbaum, Eindhoven, Netherlands

[73] Assignee: U.S. Philips Corporation, NY, N.Y.

[21] Appl. No.: 513,331

[22] Filed: Aug. 10, 1995

[30] Foreign Application Priority Data

Aug. 12, 1994 [EP] European Pat. Off. ............ 94202308

[51] Int. Cl.$^6$ .................................................. H04B 10/00
[52] U.S. Cl. ......................... 359/158; 359/183; 359/195
[58] Field of Search ........................... 359/117, 128, 359/139, 158, 140, 189, 194, 183, 187, 195

[56] References Cited

U.S. PATENT DOCUMENTS

| | | | |
|---|---|---|---|
| 4,881,788 | 11/1989 | Doran | 385/16 |
| 4,912,706 | 3/1990 | Eisenberg et al. | 359/117 |
| 4,962,987 | 10/1990 | Doran | 385/122 |
| 5,197,097 | 3/1993 | Yasushi | 380/6 |
| 5,220,448 | 6/1993 | Vogel et al. | 359/158 |
| 5,309,267 | 5/1994 | Huang | 359/139 |

OTHER PUBLICATIONS

"Demonstration of all-optical demultiplexing of TDM data at 250 Gbit/s" by I. Glesk et al, Electronics Letters, vol. 30, No. 4, Feb. 17, 1994 pp. 339–341.

"Ultra-High-Speed PLL Clock Recovery Circuit Based on All-Optical Gain modulation in Travelling-Wave Laser Diode Amplifier" by Kawanishi and Saruwatari in IEEE Journal of Lightwave Technology, vol. 11, No. 12, Dec. 1993 pp. 2123–2129.

Kawanishi et al, New-type phase-locked loop using travelling-wave laser diode, Electronics letter, vol. 24 No. 23 Nov. 10, 1988 pp. 1452–1453.

Barnsley et al, "A 4x5 Gb/s transmission system will all-optical recovery," IEEE Photon. techn. Lett. vol. 4, pp. 83–86, 1992.

Primary Examiner—Wellington Chin
Assistant Examiner—Rafael Bacares
Attorney, Agent, or Firm—Leroy Eason

[57] ABSTRACT

In a sychronizing arrangement for synchronizing two streams of optical pulses, the problem arises that for pulse frequencies above 10 GHz the operation of the synchronizing arrangement becomes increasingly difficult. To overcome that problem it has been proposed to use a phase locked loop having an optical phase detector, but prior art optical phase detectors have low efficiency and was rather complex. According to the invention an optically controlled optical switch is used as the phase detector.

11 Claims, 3 Drawing Sheets

OPTICAL SYNCHRONIZATION ARRANGEMENT

BACKGROUND OF THE INVENTION

1. Field of the Invention

The invention relates to an arrangement for mutually synchronising two streams of optical pulses, comprising an optical phase detector for deriving a phase error signal from said two streams of optical pulses, and a pulse generator for generating one of said streams of optical pulses with a pulse frequency dependent on the phase error signal The invention is also related to a receiver and a transmission system using such an arrangement.

2. Description of the Related Art

An arrangement according to the preamble is known from the journal article "Ultra-High-Speed PLL Clock Recovery Circuit Based on All-Optical Gain modulation in Travelling-Wave Laser Diode Amplifier" by Kawanishi and Saruwatari in IEEE Journal of Lightwave Technology, Vol. 11, No. 12, December 1993, pp. 2123–2129.

The trend in future optical communication system will go towards increasing bit rates in the range from 10 to 100 Gbit/s, and even above. A function that is frequently needed in such communication systems is the synchronisation of a stream of optical pulses locally generated in a transmitter or a receiver to a reference stream of optical pulses. This function may be needed in a multiplexer in order to synchronise the multiplexing operation to a reference clock, or in a receiver in which a clock signal present in the received optical signal has to be recovered from said received optical signal. Due to the increasing bit rates it becomes more difficult to realize such synchronisation by using electronic components, presently being suitable for bit rates up to 10 Gbit/s.

To avoid the use of high speed electronic components, it has been proposed to use an optical phase detector to determine the phase difference between an input stream of optical pulses, and a stream of optical pulses generated by the pulse generator. In the arrangement according to the above mentioned article the phase comparator is constituted by a polarisation controller, a 2 by 2 coupling element, a laser diode amplifier and an optical filter. In the laser diode amplifier the combination of the two streams of optical pulses causes a beat signal having a component with a frequency being equal to the difference of the pulse frequencies of both optical pulse streams. This beat signal is caused by the non-linear behaviour of the laser diode amplifier. The optical filter eliminates the optical pulse stream generated by the pulse generator from the output of the laser diode amplifier in order to enhance the beat signal. The amplification properties of the laser diode amplifier will be in general polarisation dependent. To erasure a correct operation of the optical phase detector it is required that the polarisation state of the input signal is adjusted to coincide with the polarisation of the optical pulse stream generated by the pulse generator. Therefor the polarisation controller is introduced into the arrangement.

SUMMARY OF THE INVENTION

In view of the number of needed optical components, the prior art arrangement is rather complex. The object of the present invention is to provide a system according to the preamble of which the complexity is substantially reduced. Therefor the arrangement according to the invention is characterised in that the optical phase detector comprises an optically controlled optical switch for switching one of the streams of optical pulses in response to the other stream of optical pulses.

By using an optically controlled optical switch which switches the input signal in response to the optical pulse stream generated by the pulse generator, or vice versa, a beat signal similar to that of the prior art system will be available at the output of the optically controlled optical switch. Consequently the 2 by 2 coupling element and the laser diode amplifier can be replaced by the optically controlled optical switch. Also the polarisation controller can be dispensed with, because the optical switch is in general polarisation independent.

An relatively simple embodiment of the optically controlled optical switch is characterised in that the optically controlled optical switch is controlled by the stream of optical pulses generated by the pulse generator.

Such an optically controlled optical switch is know as such from optical multiplexing and demultiplexing techniques, e.g. from European patent application No. 94201018.2, filed on Apr. 14, 1994 (PHN14814).

A preferred embodiment of the invention is characterised in that an input of the optically controlled optical switch comprises a first port of a two by two port coupling element, an output of the optically controlled optical switch comprises a second port of the two by two port coupling element, the third and the fourth port of the two by two port coupling element being mutually coupled by an non linear optical waveguide, which optically controlled optical switch comprises a further coupling element for coupling the control signal into the non linear optical waveguide, said coupling element being placed asymmetrically in the non linear optical waveguide.

By introducing a non-linear element in the optical waveguide connecting the third and the fourth port, the length of said waveguide can be drastically decreased. It is possible to reduce the length of the waveguide from several km's to several cm's, because the (small) non-linear effect in the waveguide can be replaced by the non-linear effect of the additional non-linear element. A suitable non-linear element is e.g. an optical amplifier the use of such a device as a demultiplexer is known from the article "Demonstration of all-optical demultiplexing of TDM data at 250 Gbit/s" by I. Glesk, J. P. Sokoloff and P. R. Prucnal in Electronics Letters, Vol. 30, No. 4, Feb. 17, 1994 pp. 339–341.

BRIEF DESCRIPTION OF THE DRAWINGS

The invention will now be explained in more detailed with reference to the drawings. Therein.

DESCRIPTION OF THE PREFERRED EMBODIMENTS

Figure 1:
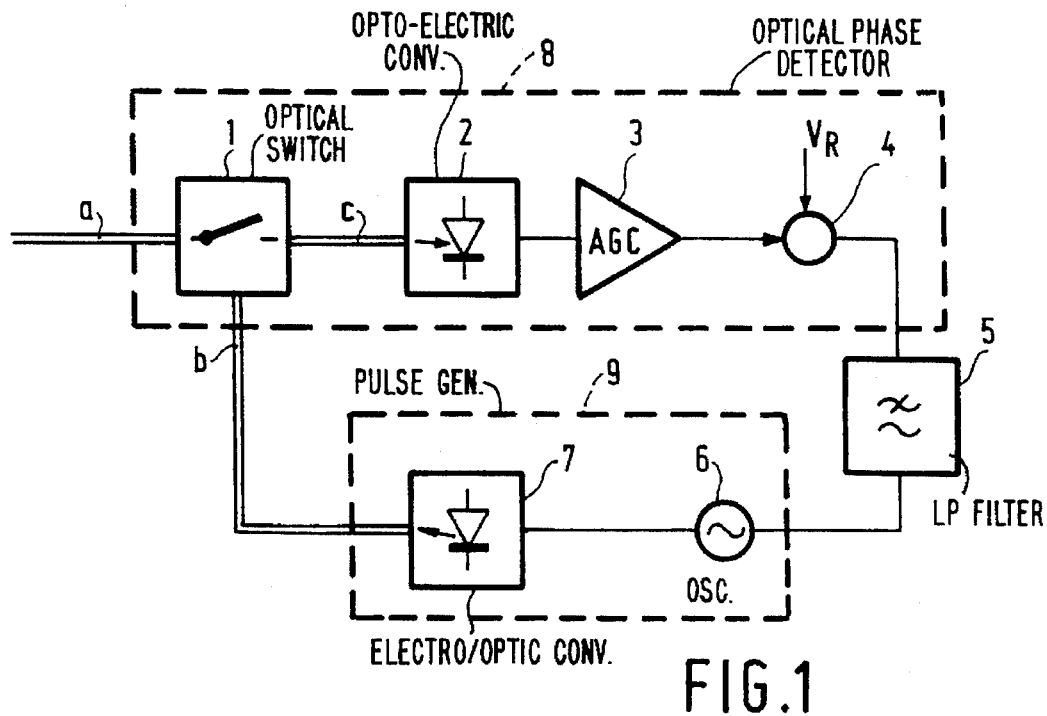
FIG. 1 shows a first embodiment of an arrangement according to the invention.

In the arrangement according to FIG. 1, an optical input signal is applied to a first input of an optical phase detector 8. In the optical phase detector 8 the input signal is coupled to a first input (a) of an optically controlled optical switch 1. An output (c) of the optically controlled optical switch 1 is coupled to an opto-electric converter 2. The output of the opto-electric converter 2 is connected to an input of an AGC (Automatic Gain Control) amplifier 3. The output of the AGC amplifier 3 is connected to a first input of a subtracter 4. A reference signal $V_R$ is applied to a second input of the subtracter 4. The output of the subtracter 4, constituting also the output of the phase detector 8, is coupled via a low pass filter 5 to a control input of the pulse generator 9. Said pulse generator 9 comprises a cascade connection of a frequency controllable oscillator 6 and an electrical-optical converter 7. The output signal of the pulse generator 9 is coupled to a second input of the optical phase detector 8. In the optical phase detector 8, said second input is coupled to a control input (b) of the optically controlled optical switch 1.

The optically controllable optical switch 1 passes the stream of optical pulses at its input (a) to its output (c) if there is an optical signal present at the control input (b) and it blocks said stream of optical pulses if no optical signal is applied at its control input. If a second stream of optical pulses is applied to the control input (b) of the optically controlled optical switch 1, said switch 1 performs a mixing operation between the two streams (c) of optical signals. The intensity of the optical signal at the output of the switch 1 will contain a component which is proportional to the phase difference between the two streams of optical pulses. The output signal of the switch 1 is converted into an electrical signal by the opto-electric converter 2. Said electrical signal is amplified by means of the AGC amplifier 3 to form a stream of pulses having an amplitude equal to $2V_R$. This means that the average value of the output signal of the AGC amplifier 3 can vary from zero to $2V_R$. By subtracting the value $V_R$ from the output signal of the AGC amplifier, a signal having an average value between $-V_R$ and $+V_R$ is obtained. The AGC amplifier is present to maintain a constant loop gain of the phase control loop, regardless of the amplitude of the input signal. The output signal of the subtracter 4 is transformed into a DC signal proportional to the phase error by the low pass filter 5. This DC signal causes the frequency of the oscillator 6 and so the frequency of the optical pulses generated by the pulse generator 9 to change to such a value that the output signal of the low pass filter 5 is equal to zero. Therefore, at the output of the pulse generator 9 is produced a stream of optical pulses having a pulse frequency in harmonic relationship to the pulse frequency of the input signal. It is to be noted that it is possible for the pulse frequency of the output signal of the pulse generator 9 be a sub-harmonic of the pulse frequency of the input signal.

Figure 2:
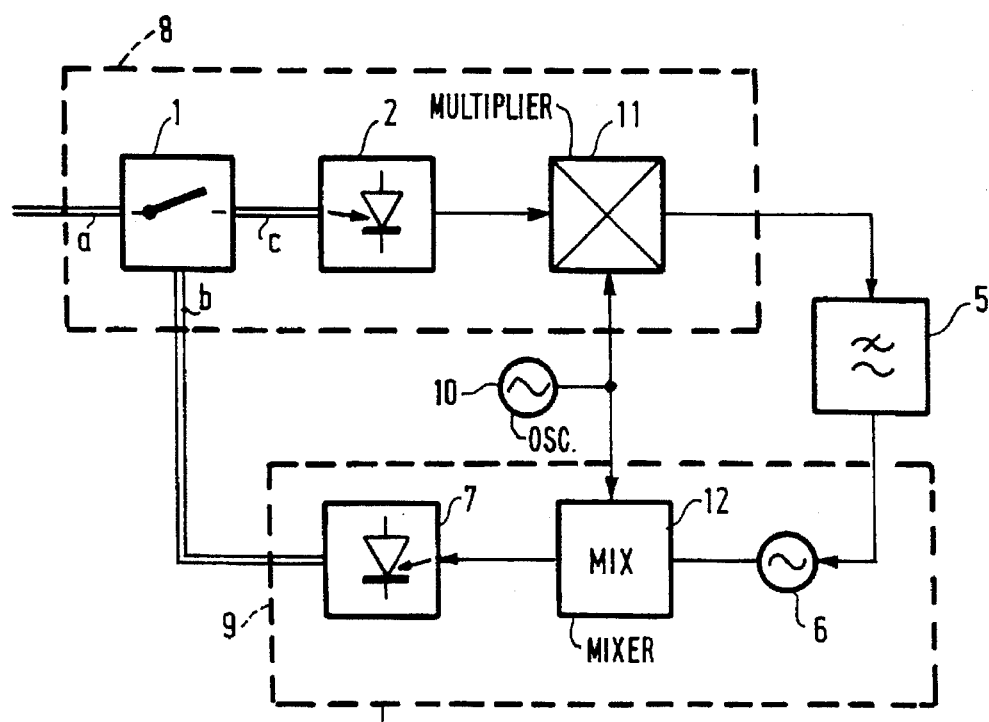
FIG. 2 shows a second embodiment of an arrangement according to the invention.

In the arrangement according to FIG. 2, an optical input signal is applied to a first input of the optical phase detector 8. In the optical phase detector 8 the signal is coupled to a first input (a) of an optically controlled optical switch 1. An output (c) of the switch 1 is coupled to an opto-electric converter 2. The output of the opto-electric converter 2 is connected to a first input of a multiplier 11. An output of an oscillator 10 is connected to a second input of the multiplier 11. The output of the multiplier 11, constituting also the output of the phase detector 8, is coupled via a low pass filter 5 to a control input of the pulse generator 9. Said pulse generator 9 comprises a cascade connection of a frequency controllable oscillator 6, a mixer 12 and an electrical-optical converter 7. The output of the oscillator 10 is also connected to an input of the mixer 12. The output of the pulse generator 9 is coupled to a second input of the optical phase detector 8. In the optical phase detector 8, said second input is coupled to a control input (b) of the optically controlled optical switch 1.

The main difference between the arrangement according to FIG. 1 and that of FIG. 2, is the introduction of the multiplier 11, the oscillator 10 and the mixer 12. In the arrangement according to FIG. 2 the multiplier 11 performs the function of a commonly known phase detector. It determines the phase difference between the output signal of the opto-electric converter 2 and the output signal of the oscillator 10. The frequency $\delta f$ of the oscillator 10 can be e.g. 100 kHz. The output signal of the multiplier, represents the result of the phase comparison.

The output signal of the controllable oscillator 6 having a frequency f, is converted into a signal having a frequency $f+\delta f$ by means of the mixer 12. The output signal of the mixer 12 is used to control the laser diode 7, in order to generate the second stream of optical pulses. The advantage of introducing the multiplier 11, the oscillator 10 and the mixer 12 into the arrangement is the suppression of the strong noise component near DC at the output of the opto-electric converter 2.

Figure 3:
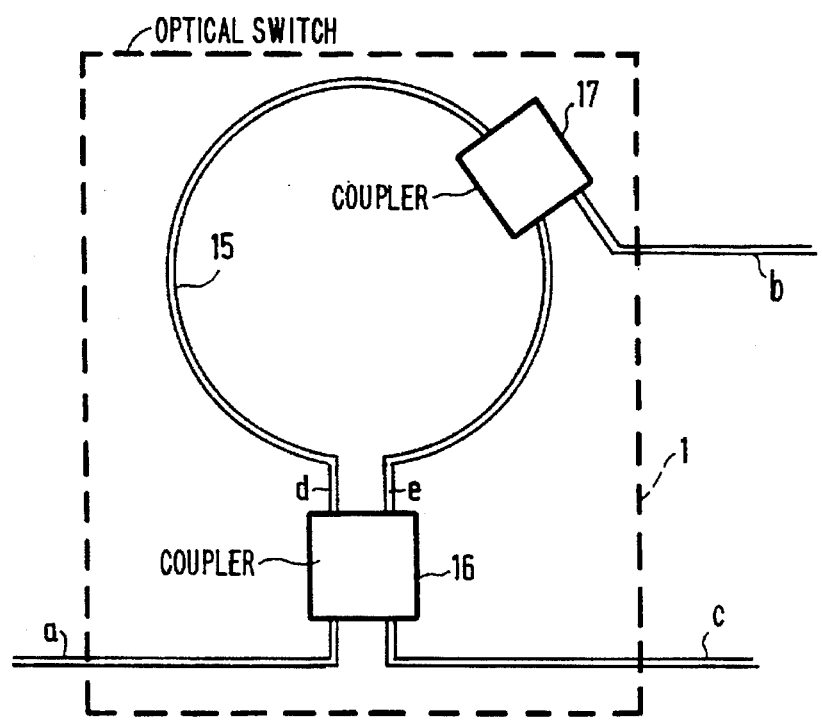
FIG. 3 shows a first embodiment of an optically controlled optical switch for use in the arrangement according to FIG. 1 or FIG. 2.

The input (a) of the optically controlled optical switch 1 according to FIG. 3, is coupled to a first port of a 2×2 coupling element 16. A second port of the 2×2 coupling element 16 is coupled to the output c of the optically controlled optical switch 1. A third port (d) and a fourth port (e) of the 2×2 coupling element 16 are mutually interconnected via a non-linear optical waveguide, being here an optical fibre loop 15. A further coupling element 17 is introduced in the optical fibre loop 15. The control signal is applied to a third port (b) of the coupling element 17.

An optical signal applied at input (a) is splitted by the 2×2 coupling element 16 into two equal portions appearing at the ports indicated with d and e of the 2×2 coupling element 16. If no optical control signal is applied at port (b) the coupling element 17, the optical signals at port d and e travel the fibre loop in opposite directions, and recombine again in the 2×2 coupling element 16. The optical signals flowing into the ports d and e are recombined by the 2×2 coupling element 16, and their combination is available at the output c of the optically controlled switch. The length of the fibre loop 15 and the properties of the 2×2 coupling element are chosen to cause the optical signals flowing into the ports d and e compensating each other by destructive interference, resulting in a zero value of the signal at output (c) of the optically controlled switch 1.

If an optical control signal is applied to the control input (b) of the switch 1, said optical signal is injected in the fibre loop 15 in one direction. Due to the non-linearity of the fibre, the symmetry in the loop is disturbed. This results in that optical signals propagating in both halves of the fibre loop 15 do not compensate any more by recombination in the 2×2 coupling element, but give rise to an output signal at the output (c) of the coupling element 16. In this way the input signal applied at input a can be switched by the optical signal at the control input (b) c of the switch 1.

Figure 4:
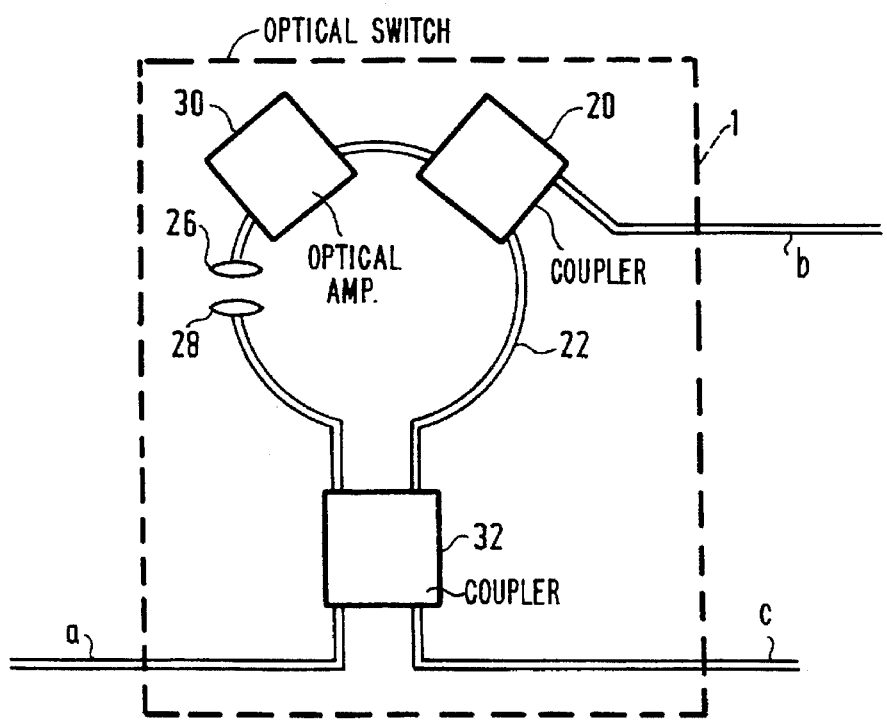
FIG. 4 shows a second embodiment of an optically controlled optical switch for use in the arrangement according to FIG. 1 or FIG. 2.

An input (a) of the optically controlled optical switch 1 according to FIG. 4 is coupled to a first port of a 2×2 coupling element 32. A second port of the coupling element 32 is coupled to the output (c) of the optically controlled optical switch 1. A third port and a fourth port of the 2×2 coupling element are mutually interconnected via an optical waveguide 22. Another coupling element 20 is introduced in the optical waveguide 22. The control signal is applied to a third port (b) of the coupling element 20. Further, an optical amplifier 30 is introduced into the optical waveguide 22. Also a combination of two lenses 26 and 28 having an adjustable distance is introduced in the optical waveguide 22.

The operation of the optically controlled optical switch 1 according to FIG. 4 is based on the same principle as the operation of the switch according to FIG. 3. due to the introduction of the (non-linear) optical amplifier 30 into the optical waveguide 22 the non-linear effect of the waveguide is not needed any more. Consequently the length of the optical waveguide can drastically be reduced. This can be a reduction from several km's to several mm's, because the waveguide is now only used for interconnection. The combination of the lenses 26 and 28 is present to enable the adjustment of the total phase shift in the optical waveguide 22.

Figure 5:
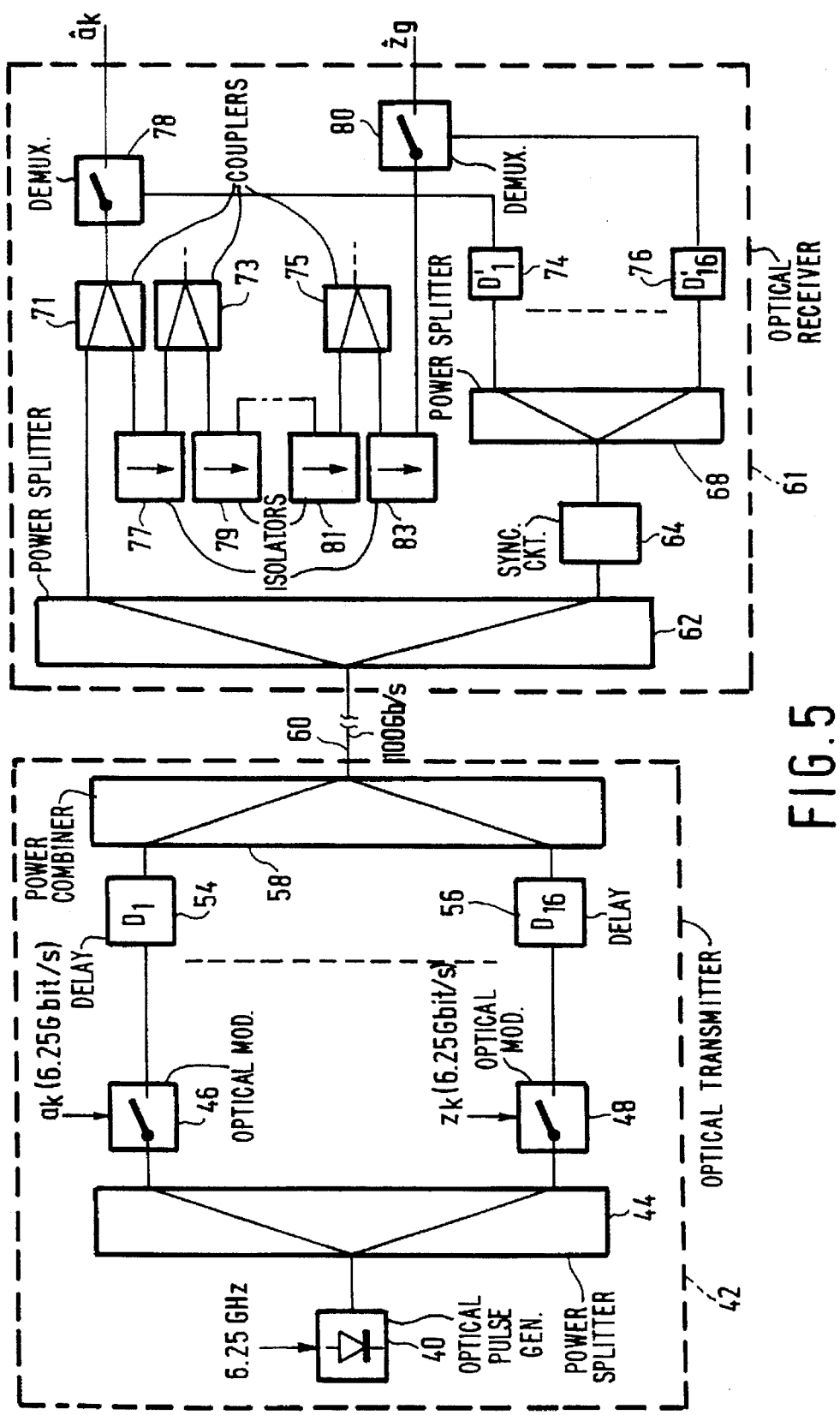
FIG. 5 shows a transmission system using an arrangement according to the invention for clock recovery.

In the 100 Gbit/s time division multiplex transmission system according to FIG. 5, a transmitter 42 is coupled via a fibre 60 to a receiver 61. In the transmitter 42, a pulsed optical signal with a pulse frequency of 6.25 GHz is generated by the optical pulse generator 40. The output of the optical pulse generator 40 is coupled to an input of a power splitter 44. A first output of the power splitter 44 is coupled to an optical modulator 46. The output of the optical modulator 46 is coupled to an input of a delay line 54 having a delay $D_1$. A sixteenth output of the power splitter 44 is coupled to an optical modulator 48. The output of the optical modulator 48 is coupled to an input of a delay line 56 having a delay $D_{16}$.

The transmitter 42 comprises in total 16 channels of modulators and delay elements. The outputs of all delay elements are combined using a power combiner 58. The output of the power combiner 58, also constituting the output of the transmitter 42 is coupled to a receiver 61 by the fibre 60.

The input signal of the receiver 61 is applied to an input of a power splitter 62. A first output of the power splitter 62 is coupled to a first port of a coupling element 71. A second port of the coupling element 77 is coupled to an input of a demultiplexing device 78. A third port of the coupling element 71 is coupled to a first port of a coupling device 73 via an isolator 77. In that way 16 coupling elements are mutually coupled. The second port of each of the coupling devices 71 ... 75 is coupled to an input of a corresponding demultiplexing device.

A second output of the power splitter 62 is coupled to a synchronisation arrangement 64 according to FIG. 1 or FIG. 2. The output of synchronising arrangement 64 is coupled to an input of a power splitter 68 having 16 outputs. Said outputs are coupled to corresponding inputs of 16 delay elements 74 ... 76 having a delay $D_1'$ ... $D_{16}'$. The output of each of said delay elements 74 ... 76 is coupled to one of the demultiplexing devices 78 ... 80. At the output of each of the demultiplexing devices 78 ... 80 the corresponding symbols â ... ŷ are available.

In the transmission system according to FIG. 5, the pulse generator 40 is arranged for generating optical pulses having a pulse frequency of 6.25 GHz, and having a width in the pico second range. These pulses are obtained by generating optical pulses by a laser, and compression of the pulses generated by the laser using a pulse compression device. The output signal of the optical pulse generator 40 is divided in 16 optical signals by the power splitter 44. Each of said optical signals is modulated in the modulators 46 ... 48 by a corresponding 6.25 Gbit/s data signal representing corresponding symbols â ... ŷ. The modulators 46 ... 48 are followed by corresponding delay elements 54 ... 56 having different delay value $D_i$ ($1 \leq i \leq 16$). The output signals of the delay elements 54 ... 56 are combined by the power combiner 58 into a time division multiplex signal with a bit rate of 100 Gbit/s.

The output signal of the transmitter 42 is transmitted via the optical fibre 10 to the receiver 61. The input signal of the receiver 61 is split into two parts by the power splitter 62. The output signal present at the first output of the power splitter 62 is fed via the coupling element 71 to the demultiplexing device 78. The output signal from the first output of the power splitter 62 is demultiplexed by the demultiplexing devices 78 ... 80. These demultiplexing devices are controlled by corresponding streams of narrow optical pulses having a pulse width in the pico second range and a repetition rate of 6.25 GHz. To enable correct demultiplexing these streams of optical pulses have a mutual displacement in time of one bit period, being 10 pico seconds. If a control pulse is applied at the control input of the demultiplexing device 78, the input signal of said device is passed to its output. If no control pulse is present the optical signal is reflected and will be passed to the next demultiplexing device via the coupling element 77 and the isolator 77. In this way the optical signal is transmitted sequentially between the demultiplexing devices until a demultiplexing device is reached that simultaneously receives a control pulse. The isolators 77 ... 83 are present to prevent undesired reflections from a succeeding demultiplexing device to a previous demultiplexing device.

In the synchronising arrangement 64 an optical stream of pulses having a repetition frequency of 6.25 GHz is derived from the received 100 Gbit/s data signal at the second output of the power splitter 62. This synchronising arrangement is comprises an arrangement according to FIG. 1 or FIG. 2, followed by a pulse compression device for obtaining narrow pulses having a width of 10 pico seconds. The output signal of the synchronising arrangement 64 is splitted into 16 parts by the power splitter 68. Each of the output signals of the power splitter 72 is delayed over a corresponding time $D_i'$ in the delay elements 74 ... 76. The delay value $D_i'$ differs one bit period (10 ps) from the delay value $D_{i+1}'$ in order to obtain correct demultiplexing. At the outputs of the delay elements 74 ... 76 the control signals for the demultiplexing devices 78 ... 80 are available. It may be necessary that the value of the delay $D_i'$ is chosen to compensate for the additional delay of the signal to be demultiplexed in the coupling elements 71 ... 75 and the isolators 77 ... 83.

I claim:

1. A synchronizing circuit arrangement for mutually synchronizing two streams of optical pulses, comprising an optical phase detector for deriving a phase error signal corresponding to a phase difference between said two streams of optical pulses, and a pulse generator for generating one of said streams of optical pulses with a pulse frequency dependent on the phase error signal; characterized in that the optical phase detector comprises an optical switch controlled by one of the streams of optical pulses to switch the other stream of optical pulses.

2. A synchronizing circuit arrangement according to claim 1, wherein the optical switch is controlled by the stream of optical pulses generated by the pulse generator.

3. A synchronizing circuit arrangement according to claim 1, wherein the optical switch comprises:

a two-by-two port coupling element (16), an input of the optical switch being a first port of said coupling element, an output of the optical switch being a second port of said coupling element, third and fourth ports of said coupling element being mutually coupled by a non-linear optical waveguide; and a further coupling element (17) for coupling the stream of optical pulses generated by the pulse generator into the non-linear optical waveguide, said further coupling element being placed asymmetrically in the non-linear optical waveguide.

4. A synchronizing circuit arrangement according to claim 1, wherein the optical switch comprises:

a two-by-two port coupling element (32), an input of the optical switch being a first port of said coupling element, an output of the optical switch being a second port of said coupling element, third and fourth ports of said coupling element being mutually coupled by an optical waveguide; and a further coupling element (20) for coupling the stream of optical pulses generated by the pulse generator into said waveguide, said waveguide comprising a non-linear optical element (30), and either of said further coupling element and said non-linear optical element being placed asymmetrically in said waveguide.

5. A synchronizing circuit arrangement according to claim 4, wherein said non-linear optical element is an optical amplifier.

6. A synchronizing circuit arrangement according to claim 5, wherein said optical amplifier is a semiconductor laser amplifier.

7. A transmission system comprising an optical transmitter coupled via an optical transmission channel to an optical receiver, the optical receiver comprising a synchronizing circuit arrangement for synchronizing a stream of optical pulses received from the optical transmission channel with a locally generated stream of optical pulses, said synchronizing circuit arrangement comprising:

an optical phase detector for deriving a phase error signal corresponding to a phase difference between said two streams of optical pulses, said phase detector comprising an optical switch controlled by one of the streams of optical pulses to switch the other stream of optical pulses; and a pulse generator for generating said locally generated stream of optical pulses with a pulse frequency controlled by the phase error signal provided by said optical phase detector.

8. A transmission system according to claim 7, wherein the optical switch is controlled by the stream of optical pulses generated by said pulse generator.

9. A transmission system according to claim 7, wherein the optical switch comprises:.

a two-by-two port coupling element (16), an input of the optical switch being a first port of said coupling element, an output of the optical switch being a second port of said coupling element, third and fourth ports of said coupling element being mutually coupled by a non-linear optical waveguide; and a further coupling element (17) for coupling the stream of optical pulses generated by said pulse generator into the non-linear optical waveguide, said further coupling element being placed asymmetrically in the non-linear optical waveguide.

10. An optical receiver comprising a synchronizing circuit arrangement for synchronizing a stream of received optical pulses with a stream of locally generated optical pulses, said synchronizing circuit arrangement comprising:

an optical phase detector for deriving a phase error signal corresponding to a phase shift between said two streams of optical pulses, said phase detector including an optical switch controlled by one of the streams of optical pulses to switch the other stream of optical pulses; and a pulse generator for generating said locally generated stream of optical pulses with a pulse frequency dependent on the phase error signal.

11. An optical synchronizing circuit for synchronizing a received digital optical signal with a local digital optical signal, comprising:

an optical pulse generator for generating said local optical signal at a frequency which is controllable by a control signal supplied to said pulse generator;

an optical switch having an input terminal for the received optical signal, a control terminal which is coupled to said pulse generator for receiving the local optical signal, and an output terminal at which said switch produces an output signal corresponding to a phase difference between the received optical signal and the local optical signal; and means coupled to the output terminal of said optical switch for deriving said control signal from said output signal and supplying said control signal to said optical pulse generator to control the frequency thereof to minimize said phase difference;

whereby the frequency of said local optical signal is adjusted by said control signal to bring it into harmonic relation with the frequency of the received optical signal.

* * * * *